US012240267B2

(12) United States Patent
Moalli

(10) Patent No.: US 12,240,267 B2
(45) Date of Patent: *Mar. 4, 2025

(54) METHOD FOR FORMING DYE SUBLIMATION IMAGES IN AND TEXTURING OF SOLID SUBSTRATES

(71) Applicant: Fresco Infusion LLC, Friday Harbor, WA (US)

(72) Inventor: John Moalli, Friday Harbor, WA (US)

(73) Assignee: Fresco Infusion LLC, Friday Harbor, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/427,488

(22) Filed: Jan. 30, 2024

(65) Prior Publication Data

US 2024/0165988 A1 May 23, 2024

Related U.S. Application Data

(63) Continuation of application No. 18/180,675, filed on Mar. 8, 2023, now Pat. No. 11,919,328, which is a continuation of application No. 17/707,718, filed on Mar. 29, 2022, now Pat. No. 11,623,468, which is a continuation of application No. 17/349,470, filed on Jun. 16, 2021, now Pat. No. 11,318,780, which is a continuation of application No. 16/743,979, filed on Jan. 15, 2020, now Pat. No. 11,065,909, which is a continuation of application No. 16/163,840, filed on Oct. 18, 2018, now Pat. No. 10,583,686.

(51) Int. Cl.

| | |
|---|---|
| ***B44C 1/00*** | (2006.01) |
| ***B41M 5/00*** | (2006.01) |
| ***B41M 5/035*** | (2006.01) |
| ***B44C 1/17*** | (2006.01) |

(52) U.S. Cl.

CPC ......... *B44C 1/1712* (2013.01); *B41M 5/0064* (2013.01); *B41M 5/0358* (2013.01)

(58) Field of Classification Search

CPC ...... B44C 1/1712; B44C 1/24; B41M 5/0064; B41M 5/0358; B41M 5/035; B41M 5/0353

USPC .............................................................. 8/471

See application file for complete search history.

(56) References Cited

U.S. PATENT DOCUMENTS

| | | | | |
|---|---|---|---|---|
| 4,174,250 | A | 11/1979 | Durand | |
| 6,508,171 | B1 | 1/2003 | Georges | |
| 6,814,831 | B2 | 11/2004 | Drake | |
| 7,081,324 | B1 | 7/2006 | Hare et al. | |
| 8,308,891 | B2 * | 11/2012 | Drake | B41M 5/025 156/247 |
| 8,562,777 | B2 | 10/2013 | Drake | |
| 8,870,972 | B2 | 10/2014 | Grier et al. | |
| 10,583,686 | B1 * | 3/2020 | Moalli | B41M 5/0353 |
| 10,940,715 | B2 | 3/2021 | Moalli | |
| 11,065,909 | B2 | 7/2021 | Moalli | |
| 2003/0192136 | A1 | 10/2003 | Magee et al. | |
| 2005/0070434 | A1 | 3/2005 | Drake | |
| 2013/0244045 | A1 | 9/2013 | Song et al. | |
| 2020/0147996 | A1 | 5/2020 | Moalli | |
| 2021/0309045 | A1 | 10/2021 | Moalli | |
| 2022/0219486 | A1 | 7/2022 | Moalli | |

FOREIGN PATENT DOCUMENTS

| | | |
|---|---|---|
| CN | 104260545 | 1/2015 |
| JP | 54-087755 | 7/1979 |
| JP | 61-207683 | 9/1986 |
| JP | 51-148752 | 6/2001 |
| JP | 2001-329474 | 11/2001 |
| JP | 2004-536233 | 12/2004 |
| JP | 2007-069954 | 3/2007 |
| JP | 2007-261601 | 10/2007 |
| JP | 2007-261602 | 10/2007 |
| JP | 4056963 | 3/2008 |
| JP | 2008-238812 | 10/2008 |

OTHER PUBLICATIONS

Office Action from U.S. Appl. No. 16/163,840 dated Sep. 18, 2019.
Notice of Allowance from U.S. Appl. No. 16/163,840 dated Oct. 20, 2019.
Japanese Office Action from Japanese Application No. 2019-189061 dated Oct. 6, 2020.
Office Action from U.S. Appl. No. 16/925,182 dated Sep. 29, 2020.
Notice of Allowance from U.S. Appl. No. 16/925,182 dated Nov. 5, 2020.
Office Action from U.S. Appl. No. 16/743,979 dated Sep. 29, 2020.
Final Office Action from U.S. Appl. No. 16/743,979 dated Jan. 8, 2021.
Notice of Allowance from U.S. Appl. No. 16/743,979 dated Apr. 1, 2021.

(Continued)

*Primary Examiner* — Eisa B Elhilo

(74) *Attorney, Agent, or Firm* — Beyer Law Group LLP

(57) ABSTRACT

A method for texturing a plastic substrate, while forming a dye sublimation image, wherein the plastic substrate has a first side and a second side is provide. A first side of a dye carrier sheet having an image of a dye sublimation ink is placed on a base. The first side of the plastic substrate is placed on a second side of the dye carrier to form a stack. A first side of a textured cover is placed on the second side of the plastic substrate. A clamping pressure is provided. The stack is heated to at least a sublimation temperature of the stack, causing the dye sublimation ink to sublimate and penetrate through the first side of the plastic substrate, creating a dye sublimation image in the plastic substrate and wherein texture from the textured cover is transferred to a side of the plastic substrate.

1 Claim, 6 Drawing Sheets

(56) References Cited

OTHER PUBLICATIONS

Japanese Office Action from Japanese Application No. 2021-066994 dated Dec. 14, 2021.
Office Action from U.S. Appl. No. 17/349,470 dated Dec. 2, 2021.
Notice of Allowance from U.S. Appl. No. 17/349,470 dated Jan. 5, 2022.
Decision of Patent Grant dated Jul. 6, 2022 for Japanese Patent Application 2021-669964.
Office Action from U.S. Appl. No. 17/707,718 dated Sep. 6, 2022.
Notice of Allowance from U.S. Appl. No. 17/707,718 dated Dec. 22, 2022.
Office Action from U.S. Appl. No. 18/180,675 dated Jun. 26, 2023.
Notice of Allowance from U.S. Appl. No. 18/180,675 dated Nov. 3, 2023.

* cited by examiner

METHOD FOR FORMING DYE SUBLIMATION IMAGES IN AND TEXTURING OF SOLID SUBSTRATES

CROSS REFERENCE TO RELATED APPLICATION

This application is a continuation of U.S. application Ser. No. 18/180,675 filed on Mar. 8, 2023, which is a continuation of U.S. application Ser. No. 17/707,718 filed on Mar. 29, 2022 (U.S. Pat. No. 11,623,468), which is a continuation of Ser. No. 17/349,470 filed on Jun. 16, 2021 (U.S. Pat. No. 11,318,780), which is a continuation of U.S. application Ser. No. 16/743,979, filed Jan. 15, 2020, (U.S. Pat. No. 11,065, 909) which is a continuation of U.S. application Ser. No. 16/163,840, filed Oct. 18, 2018, (U.S. Pat. No. 10,583,686) which are incorporated herein by reference for all purposes.

BACKGROUND

The present invention relates to the formation of images within solid sheets of a substrate and texturing the surface of the solid sheets of the substrate.

From the advent of plastics, users and manufacturers have sought a workable method for imprinting or forming images thereon. Prior imaging technologies suitable for use on other materials, for instance metals, wood, and the like, have not generally met with success when used to perform permanent imaging on plastics. Examples of such prior imaging technologies include, but are not limited to, paints, decals, lacquers, and dyes. In general, the problems associated with utilizing prior imaging or marking technologies center on certain chemical and physical properties of plastics in general.

One of the great advantages of plastics is that they can be formed into complex shapes having inherently very smooth surfaces. While this is an advantage in the manufacture of such plastic objects, the extremely smooth and often chemically resistant nature of plastic surfaces renders the application thereto of paints and the like less than satisfactory. Many paints, for instance enamels, when applied to plastics, tend to flake or peel when the plastic is flexed or when the image is subjected to physical distress, such as abrasion or temperature change.

In searching for a methodology for forming permanent, abrasion-resistant images in sheet plastics, workers in this field have noted that plastics tend to be molecularly similar to certain fabrics, which are imaged utilizing a dying process known as "dye sublimation." According to known dye sublimation processes, an image, for instance a decorative design, is formed of sublimation printing inks on a dye carrier, sometimes also referred to as a transfer paper or auxiliary carrier or sheet.

Sheets are often, but not exclusively, formed of paper. Printing the image on the sheet is carried out by any of several known printing methods including, but specifically not limited to, offset, inkjet, or rotary printing methods. The print images formed on the sheet are transferred by sublimation, also called transfer printing, from the dye carrier to the textile or fabric, which is to be decorated with the design.

There are several known dyestuffs suitable for use with dye sublimation printing techniques. The actual dye sublimation ink or dye carrier utilized is not essential to the principles of the present invention, provided that the dyestuff is capable of sublimation. This is to say that the dye sublimation ink moves directly to the vapor state from the solid state upon the application of heat. One type of printing ink suitable for sublimation printing is prepared from dye sublimation ink utilizing binders and oxidation additives. The term "sublimable" is defined herein to mean capable of sublimation.

From the foregoing discussion, it will be appreciated that one of the advantages of dye sublimation printing is that the image is actually formed within the structure of the textile, or substrate, on which it is imprinted. This is in direct contrast to most printing techniques, wherein the image is formed solely on the surface of the substrate. While surface-formed images are completely suitable for many applications, they are less than optimal for others. By way of illustration, in the preceding discussion of dye sublimation images formed in textiles, it will be appreciated that if a textile is subjected to substantial wear, as is a carpet, an image formed solely on the surface of that carpet, or on the surface of the individual carpet fibers, will tend to wear quickly.

It will further be appreciated that most inks suitable for forming surface images tend to be opaque. Again, this is suitable for many applications. However, where it is desirous that the resultant article has a lustrous or translucent property, the use of such opaque inks precludes the desired translucent image.

U.S. Pat. No. 8,308,891, issued Nov. 13, 2012, entitled "Method For Forming Dye Sublimation Images In Solid Substrates" describes a method for forming dye sublimation image in a plastic substrate and is incorporated by reference for all purposes.

SUMMARY

To achieve the foregoing and in accordance with the purpose of the present disclosure, an apparatus for texturing a plastic substrate, while forming a dye sublimation image in the plastic substrate, wherein the plastic substrate has a first side and a second side, is provided. A textured cover is on a side of a platen, wherein the platen is on a first, untextured side of the textured cover. A first side of the dye carrier is on a second, textured side of the textured cover, and wherein the plastic substrate is supported on a second side of the dye carrier, wherein a first side of the plastic substrate is supported by the dye carrier, wherein the textured side of the textured cover has a texture to be transferred to the plastic substrate. A membrane is on the second side of the plastic substrate. A vacuum pump provides a vacuum between the membrane and the platen. A heater is positioned to heat the plastic substrate.

These and other features of the present disclosure will be described in more detail below in the detailed description of the disclosure and in conjunction with the following figures.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF THE PREFERRED EMBODIMENTS

The present disclosure will now be described in detail with reference to a few preferred embodiments thereof as illustrated in the accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures have not been described in detail in order to not unnecessarily obscure the present disclosure.

While the succeeding discussion is directed to the dye sublimation imaging of plastic sheets and the like, these principles may advantageously be applied to the dye sublimation imaging of a wide variety of man-made and naturally occurring sheet material substrates, including but specifically not limited to metals, stone, wood, waxes, polymers, monomers, resins, textiles, fabrics, glasses, minerals, leather, and composites thereof. These principles specifically contemplate all such applications.

Figure 1:
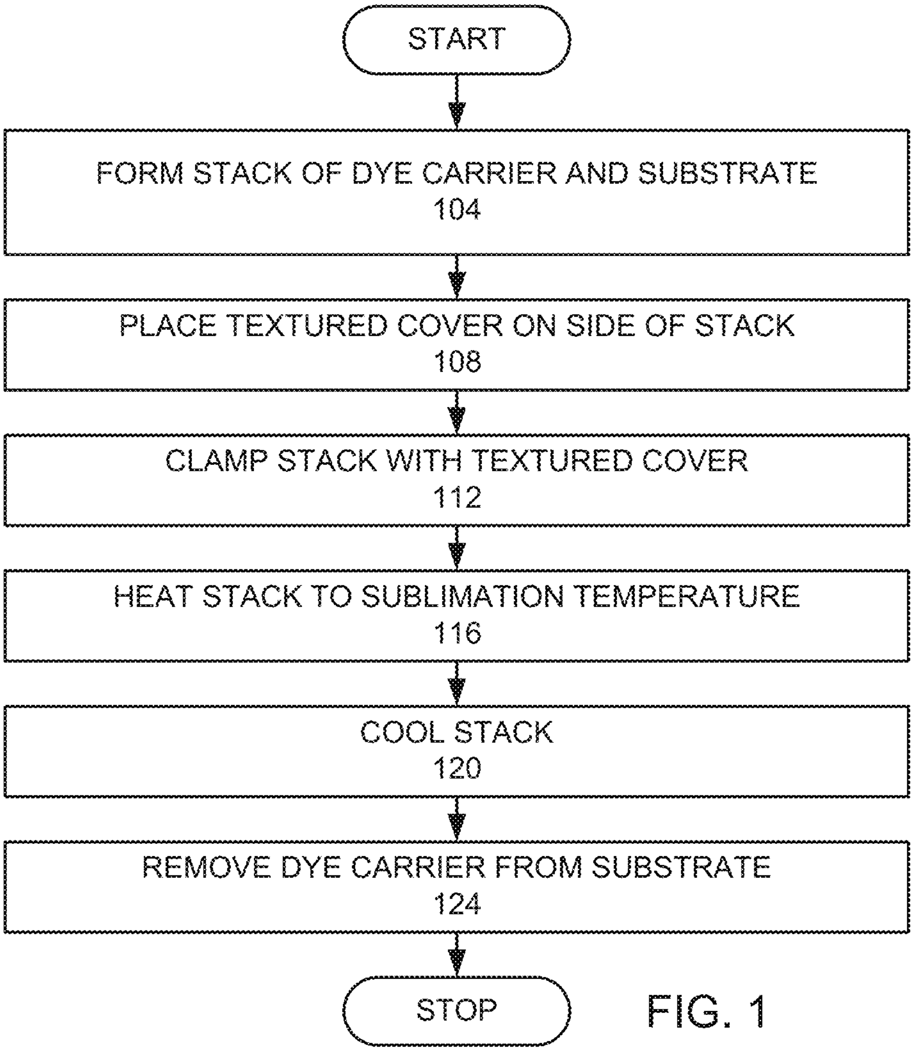
FIG. 1 is a high level flow chart of an embodiment.

To facilitate understanding, FIG. 1 is a high level flow chart of a process used in an embodiment. In this embodiment, a stack of a dye carrier and a substrate is formed (step 104). A textured cover is placed on a side of the stack (step 108). The stack and the textured cover are clamped together (step 112). The stack is heated to at least a sublimation temperature of the stack (step 116). In the specification and claims, the sublimation temperature of a stack is defined as the minimum temperature at which a solid dye on the dye carrier transitions from solid to gas phase, without passing through an intermediate liquid phase, and wherein the dye in gas phase penetrates into the substrate, where the dye creates an image in the substrate. The stack is cooled to a release temperature below the sublimation temperature (step 120). The dye carrier is removed from the substrate (step 124).

EXAMPLE

Figure 2A:
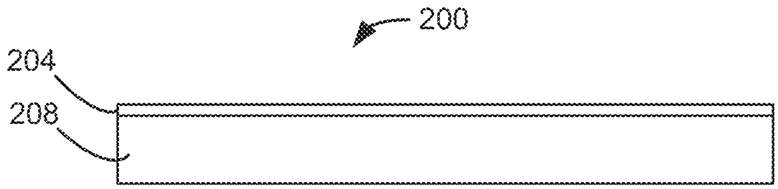
FIGS. 2A-C are schematic cross-sectional views of a stack used in an embodiment.
Figure 3:
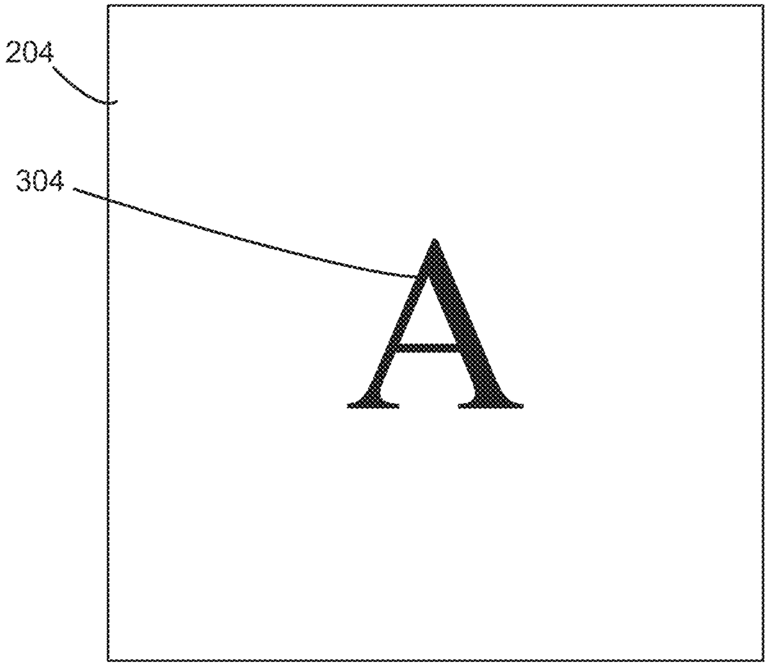
FIG. 3 is schematic top view of a dye carrier used in an embodiment.

In an example of an embodiment, a stack of a dye carrier and a substrate is formed (step 104). FIG. 2A is a side view of a stack 200 comprising a dye carrier 204 and a substrate 208. FIG. 3 is a top view of the dye carrier 204. In this example, the dye carrier 204 is paper and the substrate 208 is a thermoplastic such as acrylonitrile butadiene styrene (ABS). The dye carrier 204 and the substrate 208 are not drawn to scale. Dye sublimation ink 304 is on the dye carrier 204 creating a design.

Figure 2B:
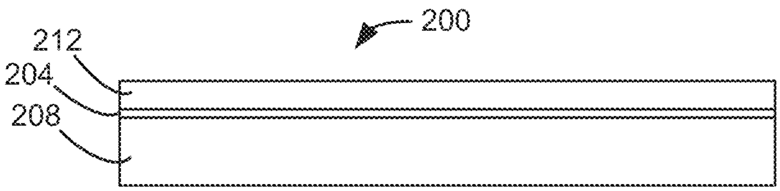
Figure 4:
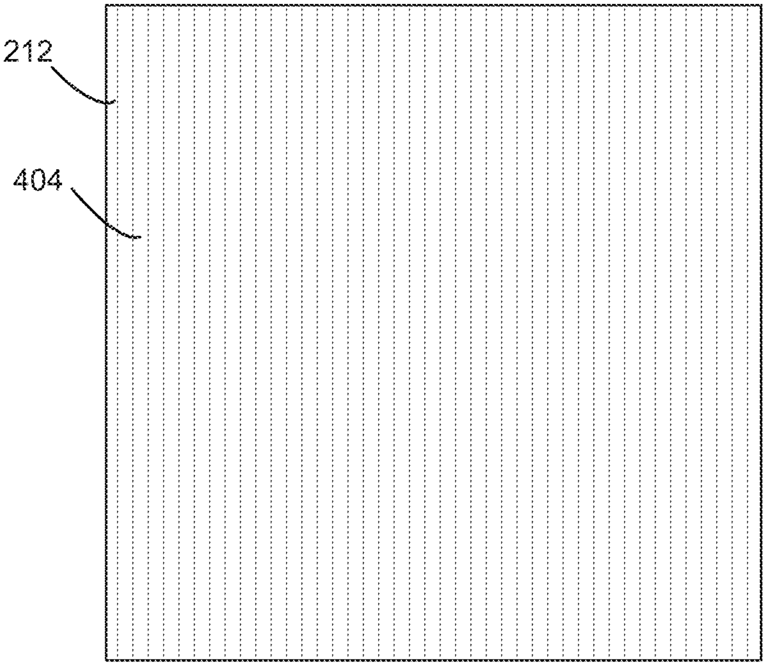
FIG. 4 is a schematic top view of a textured cover used in an embodiment.

A first side of a textured cover is placed on a side of the stack (step 108). FIG. 2B is a side view of a stack 200 with the textured cover 212 on a side of the stack 200. FIG. 4 is a top view of the first side of the textured cover 212 showing a texture of ridges 404. In this embodiment, the first side of the textured cover 212 is placed on the dye carrier sheet 204, so that the dye carrier sheet 204 is between the textured cover 212 and the substrate 208. In this example, the textured cover 212 is a metallic sheet.

Figure 2C:
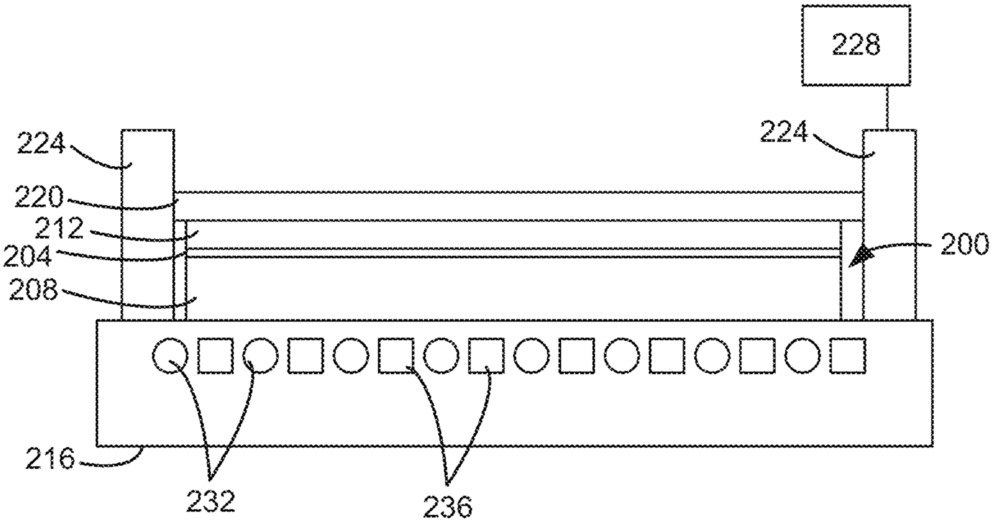

A continuous clamping pressure is provided to clamp the stack 200 and the textured cover 212 (step 112). FIG. 2C is a side view of the stack 200 and textured cover 212 being clamped by a platen 216 on the bottom and a top pressure plate 220 providing a continuous clamping pressure across the stack 200. In this example, a clamping drive 224 is connected between the top pressure plate 220 and the platen 216. The clamping drive 224 provides the continuous clamping force between the top pressure plate 220 and the platen 216. A controller 228 is controllably connected to the clamping drive 224. In this example, a pressure of at least 5 pounds per square inch is provided across the entire top surface of the stack 200. In various embodiments, even if pressure is applied uniformly, the geometry of the textured cover may cause pressure applied to the dye carrier and substrate to vary on a local level.

The stack 200 is heated to at least a sublimation temperature (step 116). In this embodiment, heating elements 232 in the platen 216 are used to heat the stack 200. In this example, the sublimation temperature, which sublimates the dye and causes the dye in gas phase to penetrate into the substrate 208 and create an image in the substrate 208, is a temperature above the glass transition temperature of the substrate 208. The glass transition temperature is a temperature for which the substrate transitions from a solid state to a viscous or rubbery state as temperature is increased. In this example, the stack is heated to a temperature of greater than 250° F. The stack is maintained at a temperature of greater than 350° F., while continuously clamped at a pressure of at least 5 pounds per square inch for at least 10 minutes.

The stack 200 is cooled to a release temperature below the sublimation temperature (step 116). In this embodiment, cooling elements 236 in the platen 216 are used to cool the stack 200. In this example, the stack 200 is cooled to a temperature below the glass transition temperature of the substrate 208. In this example, the stack is cooled to a release temperature of less than 250° F. The stack is maintained at a temperature of less 250° F., while continuously clamped at a pressure of at least 5 pounds per square inch for at least 5 minutes. In this example, at the release temperature the substrate 208 is substantially rigid.

Figure 5:
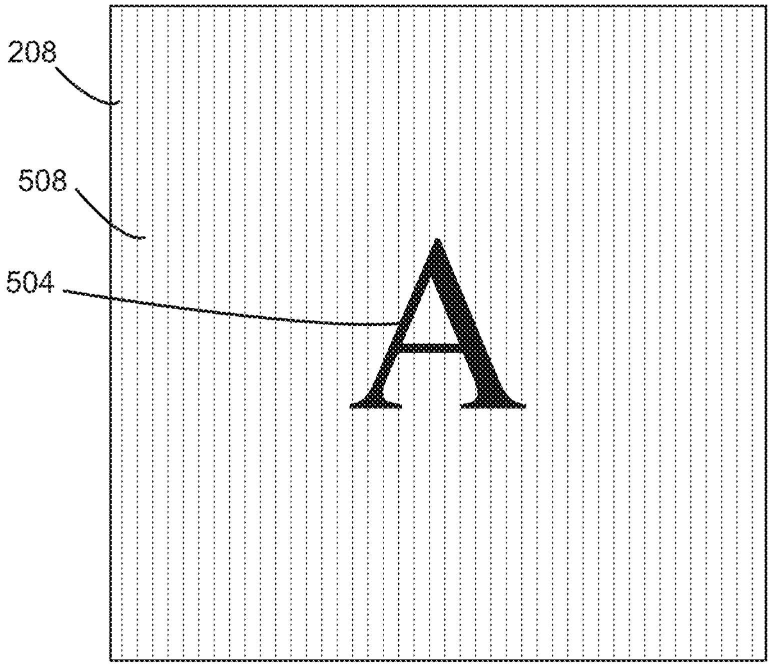
FIG. 5 is a schematic top view of a substrate processed in an embodiment

The dye carrier 204 is removed from the substrate 208 (step 124). In this example, the continuous clamping pressure is removed. The stack 200 and textured cover 212 are removed from the platen 216 and top pressure plate 220. The dye carrier 204 and the textured cover 212 are removed from the substrate 208. FIG. 5 is a top view of the substrate 208. An image 504 has been sublimated into the substrate 208 from the dye carrier 204. The sublimated dye forms an image in the substrate 208 instead of on a surface of the substrate 208. Surface texturing 508 has been transferred to the substrate 208 from the textured cover 212.

Figure 6:
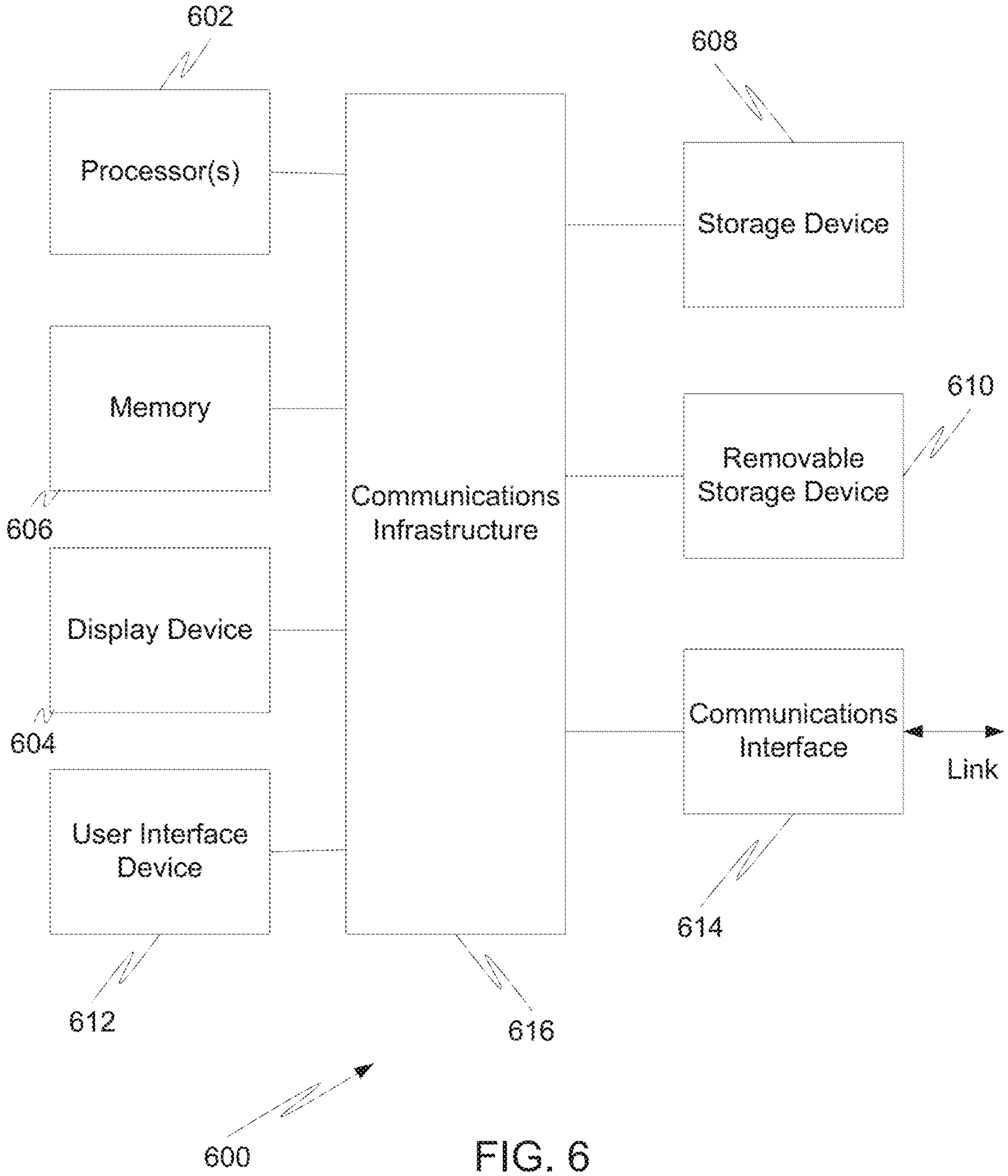
FIG. 6 is a computer system that may be used in an embodiment.

FIG. 6 is a high level block diagram showing a computer system 600, which is suitable for implementing a controller 228 used in embodiments. The computer system may have many physical forms ranging from an integrated circuit, a printed circuit board, and a small handheld device, up to a huge super computer. The computer system 600 includes one or more processors 602, and further can include an electronic display device 604 (for displaying graphics, text, and other data), a main memory 606 (e.g., random access memory (RAM)), storage device 608 (e.g., hard disk drive), removable storage device 610 (e.g., optical disk drive), user interface devices 612 (e.g., keyboards, touch screens, keypads, mice or other pointing devices, etc.), and a communication interface 614 (e.g., wireless network interface). The communication interface 614 allows software and data to be transferred between the computer system 600 and external devices via a link. The system may also include a communications infrastructure 616 (e.g., a communications bus, cross-over bar, or network) to which the aforementioned devices/modules are connected.

Information transferred via communications interface 614 may be in the form of signals such as electronic, electromagnetic, optical, or other signals capable of being received by communications interface 614, via a communication link that carries signals and may be implemented using wire or cable, fiber optics, a phone line, a cellular phone link, a radio frequency link, and/or other communication channels. With such a communications interface, it is contemplated that the one or more processors 602 might receive information from a network, or might output information to the network in the course of performing the above-described method steps. Furthermore, method embodiments may execute solely upon the processors or may execute over a network such as the Internet, in conjunction with remote processors, that shares a portion of the processing.

The term "non-transient computer readable medium" is used generally to refer to media such as main memory, secondary memory, removable storage, and storage devices, such as hard disks, flash memory, disk drive memory, CD-ROM, and other forms of persistent memory and shall not be construed to cover transitory subject matter, such as carrier waves or signals. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

In this embodiment, the controller 228 has non-transitory computer readable media. The computer readable media has computer readable code for providing the heating, the cooling, and the continuous clamping pressure during the heating and cooling and any time in between.

The texture can be simple, as in lines, to complex, as in pores and wrinkles to mimic leather. The depth and level of texturing in different embodiments may vary from slight (a few mils), to heavy (hundreds of mils). The depth of texturing need not be continuous over the substrate, but rather can be made to vary depending on the needs and shape of the final product.

In an example of the dye carrier 204, the dye carrier is paper made from cellulose fibers, which are preferably natural fibers. In this example, the release properties of the paper surface are modified by silicone, or organosilane, organofluorine, long chain amide, polytetrafluoroethylene (PTFE), or other internal/surface additives, which will facilitate release of the paper from thermoplastic substrates. Some thermoplastics, such as acrylics, have a greater propensity to adhere to the transfer paper than others do.

Figure 7:
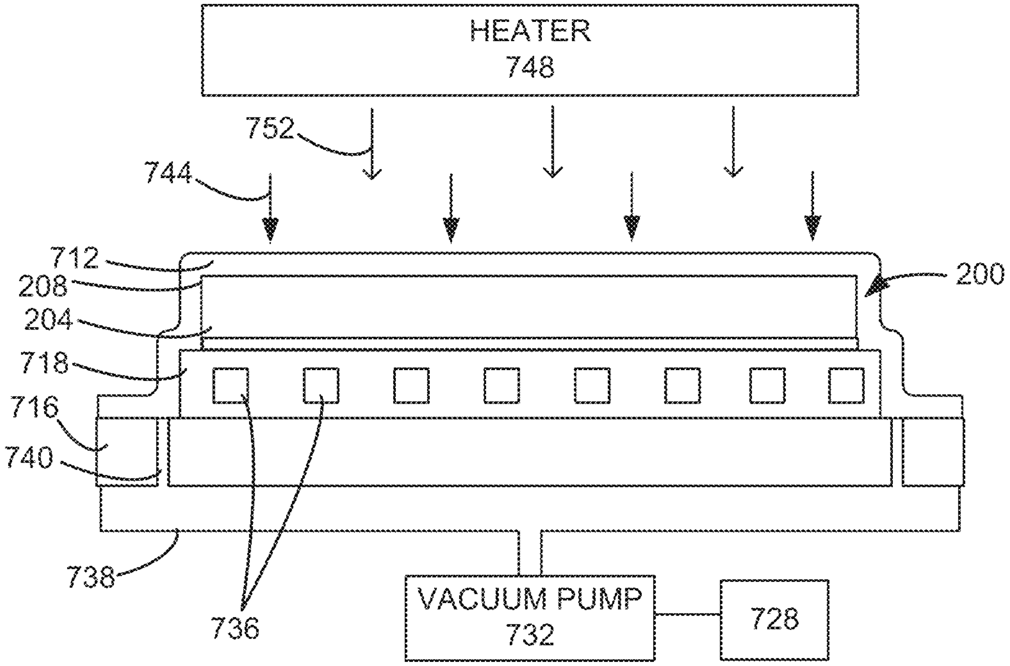
FIG. 7 is a schematic cross-sectional view of another embodiment.

FIG. 7 is a schematic cross-sectional view of a stack 200 in another embodiment of a press. The press comprises a platen 716 with a cooling plate 718. The stack 200 with the substrate 208 and dye carrier 204 is placed on the cooling plate 718. In this embodiment, the textured cover 712 is a flexible airtight membrane. In this example, the textured cover 712 is a silicone membrane. In this embodiment, the textured cover 712 is placed on a second side of the substrate 208, where the dye carrier 204 is placed on a first side of the substrate 208. The substrate 208 is between the dye carrier 204 and the textured cover 712. A vacuum pump 732 provides a vacuum to a vacuum chamber 738. The vacuum chamber 738 draws air through evacuation channels 740, which draw air from between the textured cover 712, the platen 716, the stack 200, and the cooling plate 718. The evacuation of the air between the textured cover 712 and the stack 200 and the atmospheric pressure outside of the textured cover 712 clamps the textured cover 712 to the stack 200 (step 112) and creates the continuous clamping pressure 744.

In this embodiment, a heater 748 provides heat 752 to heat the stack 200 to a temperature above the sublimation temperature of the stack (step 116). In this embodiment, the heat 752 passes through the textured cover 712 to the stack 200. In this example, the stack 200 is heated to a temperature above 350° F. The stack 200 was maintained above the sublimation temperature for at least 10 minutes.

In this embodiment, the cooling of the stack 200 (step 120) is provided by the cooling plate 718. In this example, cooling elements 736 are used to cool the cooling plate 718. In other embodiments, passive cooling may be used to cool the stack 200. Such passive cooling would use radiant cooling instead of cooling elements 736 to cool the stack 200. The controller 728 is controllably connected to the vacuum pump 732, the heater 748, and the cooling elements 736.

The continuous pressure is removed (step 124) by allowing a flow of gas to remove the vacuum. The dye carrier 204 is removed from the substrate 208 (step 124). It has been found that texture from a silicone membrane is transferred to the substrate 208 during the sublimation process.

If the textured cover is a membrane, which is also used to provide a vacuum based clamping, the membrane must have sufficient strength to prevent warping of the substrate. The membrane material is preferably compatible with the dye and byproducts out-gassed from the substrate. Preferably, the membrane is able to withstand several thermal cycles between higher and lower temperatures without hardening, cracking, or loss of structural integrity. Materials for forming the membrane may be one or more of vulcanized rubbers, silicones, butyl rubbers, polymers, chloropolymers, or fluoropolymers.

In various embodiments, the material forming the textured cover may be metal, rubber, plastic, wood, paper, or cardboard. The texturing may be provided by an additive process, such as 3D printing or welding on the first side of the cover. In other embodiments, a molding process may be used to form the textured cover, such as using a cover material that is a liquid and poured or injected into a mold and then hardened. The hardened material is removed from the mold and used as the textured cover. In other embodiments, a subtractive process may be used to form the textured cover by cutting or removing material from the cover, using a laser cutting, water j et cutting, drilling, planing, electrical discharge machining, electrochemical machining, electron beam machining, photochemical machining, or traditional machining. In other embodiments, the texturing may be provided by a deformation process, such as stamping, extrusion, pultrusion, rolling, forging, or die forming.

In various embodiments, the substrate 208 is a thermoplastic item. The thermoplastic may be one or more of ABS (Acrylonitrile Butadiene Styrene), PVC (Polyvinyl chloride), PVF (PolyVinyl Fluoride), PET (Polyethylene Terephthalate), PBT (Polybutylene terephthalate), polyesters, polycarbonates, acrylic alloys, thermoplastic Urethane, Lexan™ by GE, Valox™ by GE, Altuglas Solarkote™, Plexiglas™, Tedlar™ by Dupont, and Korad™ Polymer Extruded Products (Spartech).

Alternative embodiments utilize other means of attaining the very even clamping pressure. These alternatives include, but are not necessarily limited to, the use of mechanical clamping pads incorporating a pressure-leveling layer, such as foam rubber or sacrificial rigid foam sheets, and the use of air pressure clamps, such as bag presses.

Alternative embodiments utilize various heat transfer methods. Such heat transfer methods may include electrical resistance heating, steam heating, flame heating, fluid heating, or radiant energy heating.

While the specifics of any given imaging regime are both highly specific and empirically determinable, in general terms, the present invention contemplates imaging temperatures for most plastic substrates at temperatures between 200° F.-600° F. More particularly plastic substrates are heated to temperatures between 225° F. and 400° F. More particularly still plastic substrates are heated to temperatures between 250° F. and 370° F.

In various embodiments, the heating and cooling steps for imaging may be for periods between 15 seconds to 12 hours. More specifically, the heating and cooling steps for imaging may be for periods from 1 minute to 1 hour. More specifically, the heating and cooling steps for imaging may be for periods between 90 seconds to 15 minutes.

In various embodiments, the clamping pressure is from 0.25 atmospheres to 20 atmospheres. More particularly, the clamping pressures are from 0.5 to 5 atmospheres. More particularly, imaging pressures are from 0.7 to 1.5 atmospheres. The imaging pressures are satisfactory for a wide variety of plastic substrates.

The provision of a continuous pressure from the heating region to the cooling region may improve the sublimation process. Without being bound by theory, it is believed that, since the pressure is not removed as the substrate and dye carrier passes from a heating step to a cooling step, the image quality is improved. It is further believed that the continuous pressure helps to keep the substrate from shrinking, enlarging, extruding, or warping in at least one direction and in possibly all directions. Shrinking, enlarging, extruding, and warping may also be limited by the lower temperature and lower pressure required by various embodiments.

Various embodiments for providing continuous pressure, heating, or cooling are described in U.S. Pat. No. 6,814,831, entitled "Method and apparatus for continuously forming dye sublimation images in solid substrates," issued on Nov. 9, 2004, which is incorporated by reference for all purposes.

In various embodiments, the substrate subsequently may be reheated to a temperature between 275° F. and 400° F. to allow thermal forming of the substrate. The substrate may be thermal formed where an elongation of more than 40% of a region of the substrate may occur. An elongation of up to 60% would not cause the image at the region of elongation to thin appreciably (significantly reduce the intensity of the image).

While this disclosure has been described in terms of several preferred embodiments, there are alterations, permutations, modifications, and various substitute equivalents, which fall within the scope of this disclosure. It should also be noted that there are many alternative ways of implementing the methods and apparatuses of the present disclosure. It is therefore intended that the following appended claims be interpreted as including all such alterations, permutations, and various substitute equivalents as fall within the true spirit and scope of the present disclosure.

What is claimed is:

1. A method for texturing a plastic substrate, while forming a dye sublimation image in the plastic substrate, wherein the plastic substrate has a first side and a second side, comprising:

placing a first side of a dye carrier sheet having an image formed thereon of a dye sublimation ink on a base;

placing the first side of the plastic substrate on a second side of the dye carrier to form a stack;

placing a first side of a textured cover on the second side of the plastic substrate;

providing a clamping pressure on the textured cover and the stack, wherein the stack and textured cover are clamped together; and heating the stack to at least a sublimation temperature of the stack, which causes the dye sublimation ink to sublimate and penetrate through the first side of the plastic substrate, creating a dye sublimation image in the plastic substrate and wherein texture from the textured cover is transferred to a side of the plastic substrate.

* * * * *